United States Patent
Hicks

(10) Patent No.: US 7,031,034 B2
(45) Date of Patent: Apr. 18, 2006

(54) ARTICULATING CAMERA FOR DIGITAL IMAGE ACQUISITION

(75) Inventor: Ray Hicks, Fenton, MI (US)

(73) Assignee: Eastman Kodak Company, Rochester, NY (US)

( * ) Notice: Subject to any disclaimer, the term of this patent is extended or adjusted under 35 U.S.C. 154(b) by 894 days.

(21) Appl. No.: 09/960,675

(22) Filed: Sep. 21, 2001

(65) Prior Publication Data

US 2002/0051642 A1    May 2, 2002

Related U.S. Application Data

(60) Provisional application No. 60/236,443, filed on Oct. 2, 2000.

(51) Int. Cl.
*H04N 1/04* (2006.01)

(52) U.S. Cl. .................. 358/487; 358/506; 358/405; 358/494

(58) Field of Classification Search ............. 358/474, 358/475, 400, 401, 1.15, 1.16, 505, 408, 358/471, 494, 497, 513, 527, 487, 482, 483, 358/486, 488; 382/313, 317
See application file for complete search history.

(56) References Cited

U.S. PATENT DOCUMENTS

| 5,706,049 A | 1/1998 | Moghadam et al. |
| 5,768,444 A | 6/1998 | Nishimura |
| 5,794,788 A * | 8/1998 | Massen ..................... 209/524 |
| 5,799,219 A | 8/1998 | Moghadam et al. |
| 5,850,579 A * | 12/1998 | Melby et al. ............... 396/427 |
| 5,920,342 A | 7/1999 | Umeda et al. |
| RE36,535 E * | 1/2000 | Hicks .......................... 430/21 |
| 6,195,176 B1 * | 2/2001 | Tanno et al. ................ 358/400 |
| 6,266,127 B1 * | 7/2001 | Iida .............................. 355/38 |
| 6,275,282 B1 * | 8/2001 | Hicks .......................... 355/40 |

FOREIGN PATENT DOCUMENTS

| GB | 2 105 859 A | | 3/1983 |
| JP | 10271274 | * | 10/1998 |
| WO | WO0230107 | * | 4/2002 |

* cited by examiner

*Primary Examiner*—Jerome Grant, II
(74) *Attorney, Agent, or Firm*—David A. Novais

(57) ABSTRACT

The invention is an apparatus for capturing photographic images from film using a digital camera and encoding image information as digital data to facilitate editing and printing of finished photographs. The apparatus includes a film transport, an optical stage, sensors for detecting the position and identification marks on individual frames of the film, a digital camera and a computer system for controlling the apparatus and manipulating image and editing data. A feature of the invention is an articulating digital camera which is movable in relation to the optical stage of the device. The camera is positioned, under computer control, in the Y, Z and rotation (R) axis in relation to the images on the film. This permits a broad range of editing tasks to be performed in conjunction with the capture and storage of the digital images created by the device.

4 Claims, 15 Drawing Sheets

ARTICULATING CAMERA FOR DIGITAL IMAGE ACQUISITION

RELATED APPLICATION

This application is related to, and claims the benefit of priority from, U.S. Provisional Patent Application Ser. No. 60/236,443, filed Oct. 2, 2000.

FIELD OF THE INVENTION

The invention pertains to an apparatus for capturing a digital image from a photographic negative, and more specifically, for selectively positioning a photographic image capturing device in relation to a continuous roll of photographic negatives.

BACKGROUND OF THE INVENTION

Conventional chemical photographic image processing has evolved from manual to semi-automatic to nearly fully automatic operation in recent years. Additionally, the wide availability of high quality digital photographic image processing equipment has further streamlined the process of editing photographic images and producing prints from negatives. These advances have resulted in substantially reduced costs, as well.

In the traditional photographic image processing operations prevalent at high volume photographic laboratories, it is known to splice several rolls of developed film together to form a continuous strip of photographic negatives, each strip containing several hundred individual images. To keep track of these images and edit them in a high production environment is a complex task. Each photographic image must be identified by a discrete code or number. This code may then be correlated with identifying data regarding the image, for example, the name and address of the photographer, the photographer's job number, the frame number within the photographer's job, as well as color correction, balance, cropping and orientation information. Only by associating all of this information with a discrete identifying number can the photographic laboratory and its customer, the photographer, be assured that photographic prints generated from the photographic negatives are correctly produced and routed.

It is well known to produce photographic film processing machines which automatically detect the edge of individual photographic frames on a long roll of developed photographic negative film, and to affix to each frame (usually at the edge) a marking, often in the form of punched holes or notches to identify each frame. It is also well known to use such marked film in a photographic editing and/or printing apparatus, and to manipulate the film in relation to a fixed photographic imaging apparatus such as an enlarger or lamp house, or in relation to a digital video imaging device such as a CCD digital video camera.

Traditionally, such video imaging devices have been fixed in relation to the path of travel of the long roll of negatives being imaged, and correction of tilted images, reorientation between landscape and portrait formats, and selection of optical centers of the image have been handled by selective movement of a carrier upon which the strip of negative film is mounted. Examples of this type of technology can be found in my U.S. Pat. No. 5,097,292. The focus of the video imaging device in relation to the negative images on the film has also been fixed, preventing corrections for out-of-focus conditions which may arise.

It is equally well known to utilize digital cameras to transfer photographic images, in digital format, to computers or to computer databases. A simple example of this type of device is found in U.S. Pat. No. 5,920,342 (Umeda). The video-imaging devices taught in the prior art, however, are incapable of providing customized articulated movement in relationship to the plane of the image being scanned.

SUMMARY OF THE INVENTION

My invention incorporates the use of an articulating digital photographic imaging device associated with a long roll film transport, edge detector and punch.

It is possible to enhance the productivity of the photographic laboratory by further automating the long roll film handling process utilizing my invention. The image capture and encoding device herein described detects frame numbers, punches frame numbers and acquires high quality full frame digital images from a wide variety of film formats. Utilizing an articulating camera assembly, formatting, editing and image size variations can be done through software control by virtue of appropriate electrical connections and instructions between the image capture and encoding device and a digital computer. The device combines several process steps, previously performed in discrete locations, into a single work station.

The frame edge detection element automatically detects frame edges and so identifies the optical center of each individual frame. The hole punch element places standard binary punch patterns on each individual frame in one embodiment.

A digital CCD camera, associated with a tri-color (RGB) light source is mounted to provide camera movement in relation to the film. Using appropriate digitally controlled motors, the distance of the camera from the film, the Y-axis positioning of the camera in relationship to the film center line, the rotation of the camera and focusing can all be controlled utilizing an associated computer running a conventional operating system and specialized software which forms a part of my invention.

Embodiments of my invention include the ability to separately identify frames from appropriately perforated film, and to read bar codes encoded on the film. The associated software provided with my invention permits a full range of editing, including photograph composition, color balance, orientation, enlargement, refocusing, tilting and touch-up. By providing both the laboratory and the photographer with complimentary software, editing and printing instructions may be freely exchanged utilizing transportable media or computer networks to transmit data between the photographer, the photographic laboratory and the customer.

DETAILED DESCRIPTION OF THE INVENTION

The operation of the invention will best be understood first by reference to the overall process defining the environment in which the hardware and software perform, next by analyzing the overall configuration and interconnection of the various hardware elements, and finally by analyzing the hardware elements of the invention in detail.

Figure 1:
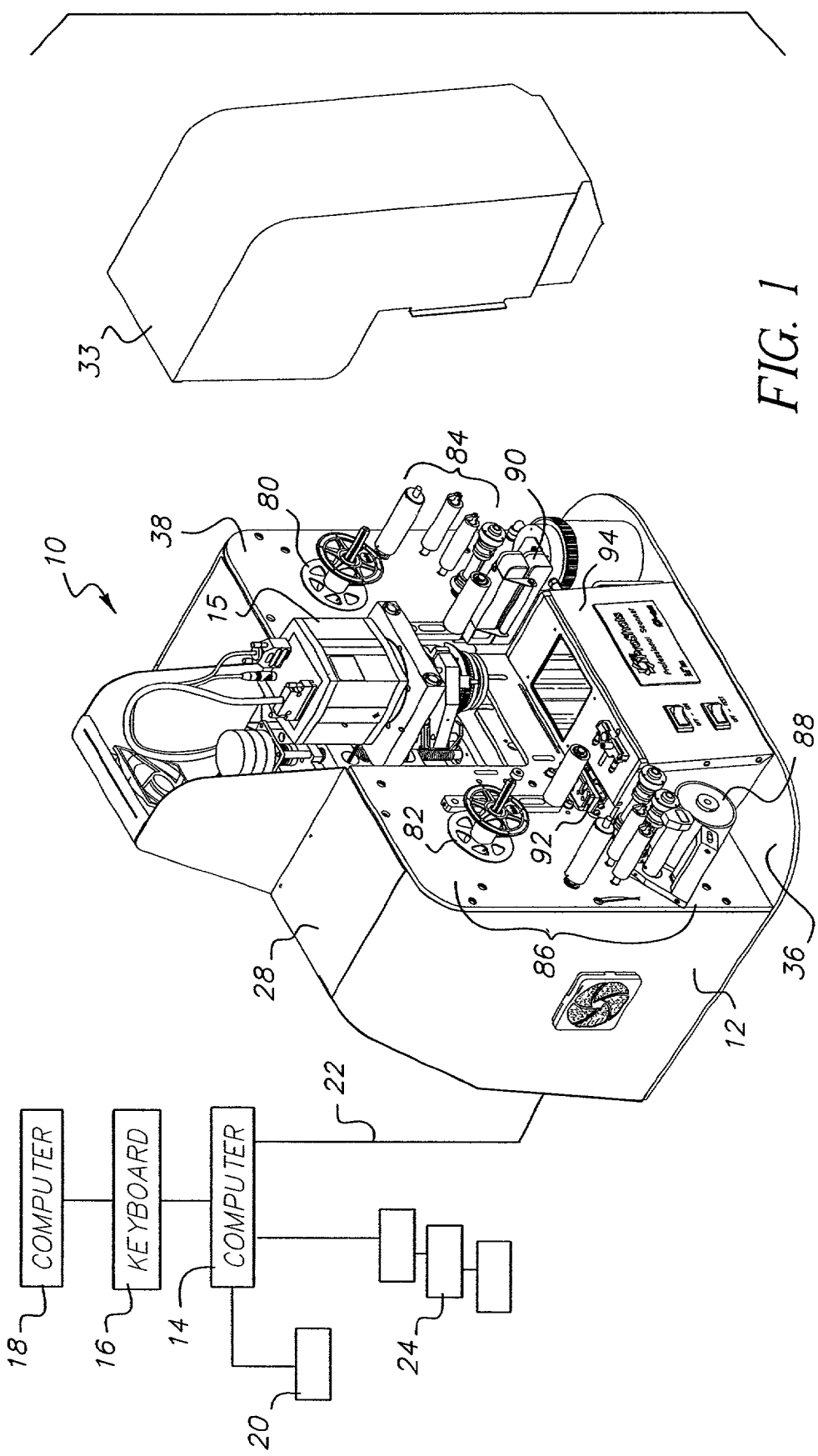
FIG. 1 is a perspective view of the image capture and encoding portion of the apparatus, showing its interconnection to a computer and data network.
Figure 2:
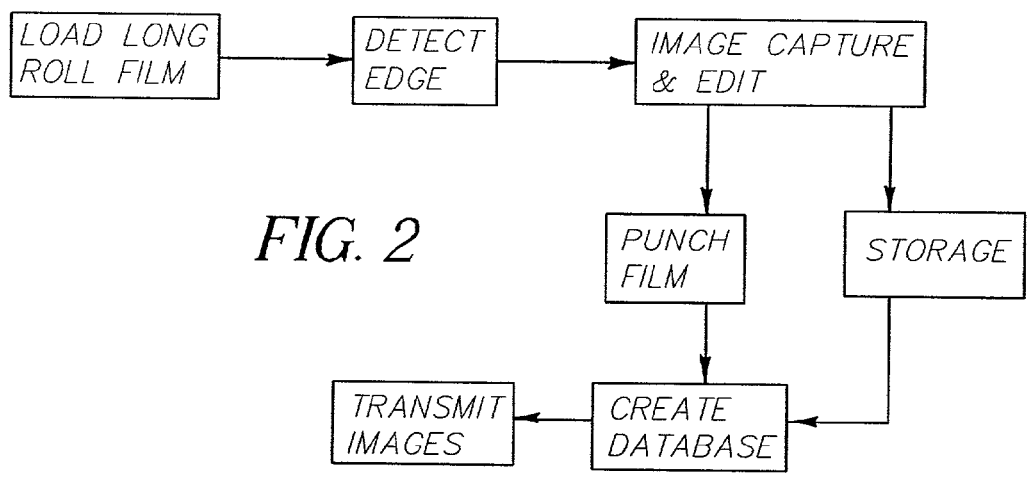
FIG. 2 is a flow chart outlining the initial image capture steps.
Figure 3:
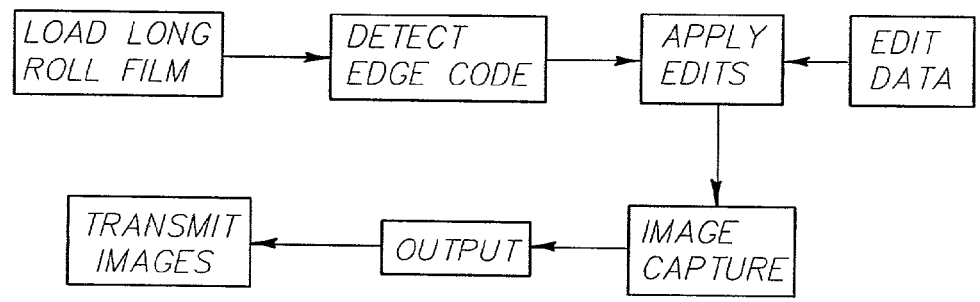
FIG. 3 is a flow chart showing secondary editing steps.

FIG. 2 and FIG. 3 are simplified flow charts of operations. The image capture and encoding apparatus 10 (as shown in FIG. 1) is designed to operate on a long roll of film, typically created from splicing together two or more rolls of film exposed by the photographer during a typical photographic job. In some instances, the long roll of film may contain multiple jobs for the same photographer, and on rare occasions, may include multiple rolls of film from multiple photographers. The rolls of film are spliced together using well known techniques, thereby presenting to the image capture and encoding apparatus 10 a continuous strip of film, often including several hundred individual exposures.

The next step in the film image capture process is the accurate detection of a leading or trailing edge of the individual frames found on the film. Typically, this involves the use of an array of optical sensors positioned in relation to the film, and comparing detailed information regarding the optical density of the film in relation to known standards. These techniques, which are well known, result in the reliable detection of at least one edge of the exposure constituting what is conventionally viewed as a negative image on developed photographic film.

Once the edge of the image is detected, a suitable apparatus, having been provided with information regarding the precise dimensions of each exposure on the film, is able to position each successive photographic image, properly centered, in proximity to an image capturing device, such as a solid state video camera. Simultaneously with the positioning of the film, the film is illuminated, usually from the side opposite the video camera, to project the negative image to the video camera. This procedure, which will be explained further on in this disclosure, results in the creation of one or more digitized images corresponding to the negative image. This digital information is stored in a pre-established format for later use.

Simultaneously with capture of image, the edge of the film is punched proximate to each negative image. As a result, each frame of the photographic film is provided with a permanent identifying mark near the film edge, where it does not interfere with the appearance of the photographic image, either when digitized, or when printed to photographic paper.

The next step in the process is the creation of a data base of digital images, which are organized and stored into a digital file for transmission to the photographer and/or the photographer's customer. Typically, at this point in time, the images are "proof" images only, having merely been scanned, captured and identified by an appropriate code, subjected to preliminary editing and placed into an appropriate digital file. The preliminary editing is accomplished using image inspection software, and may include color correction, positioning and orientation edits, for example.

The purpose of all of the foregoing steps is to create for the photographic laboratory and for the originating photographer a collection of digital proofs which can be viewed and edited further. These digital proofs may be transmitted by the laboratory to the photographer utilizing an inexpensive transportable medium, such as CD ROM, or may be transmitted to the photographer and/or his or her customer by transmitting the data over a network, such as the Internet. Once the photographer either independently, or with input from the customer, has viewed the proofs, the photographer will typically select one or more of the images for final production. The photographer will specify for the laboratory a variety of parameters for each image to be produced as a finished print. Sample parameters are image orientation (e.g. landscape or portrait), color balance, centering and cropping, magnification, print size, or color correction. Further, the photographer may provide to the laboratory instructions for retouching of photographs to remove blemishes, alter skin tone, remove undesirable reflections or add graphics or matting.

Once these editing decisions have been made, the process continues as outlined in the flow chart shown in FIG. 3. The database of editing information provided by the photographer, and corresponding to the database of images produced in the initial imaging steps provides the photograph laboratory useful editing information in relation to the previously presented roll of film. Once this information has been received, the previously scanned and punched film is again loaded to the image capture and encoding apparatus, mounted and threaded for further processing. At this stage of the process, each image selected by the photographer for printing is identified by its edge code and transported by the apparatus to its optical stage. Utilizing the editing information provided by the photographer, the magnification, focus, orientation, tilt, cropping, and color balance of the image may be adjusted as the image is recaptured for production purposes.

The photographic image may then be produced directly by digital output from the edited digital image, or the revised editing information created during the recapture process may be utilized to drive the components of a conventional photograph printer to insure correct orientation, cropping, color balance, and other parameters when the photographic image is presented to the photographic printer for the exposure of photographic paper.

In FIG. 1, the major components of the image capture and encoding apparatus are depicted. The principal components are the film encoding station 12, the computer 14, the computer keyboard 16, the computer monitor 18 and the secondary computer input device 20, in one embodiment, a mouse, although a track ball or digital writing tablet performs equally well. The film encoding station 12, and its associated internal electronic components, are connected by cable 22 or infrared data ports to the computer 14. The computer 14, in turn, may be appropriately connected to a computer network 24 utilizing well known data processing network equipment and techniques.

The computer 14, keyboard 16, and input device 20 are preferably stand alone desktop type personal computer components of the type manufactured by IBM®, Hewlett Packard®, Dell®, Compak®, and a wide variety of other manufacturers. Typically, these computers are provided with a central processing unit, random access memory of sufficient size to accommodate the relatively large file sizes resulting from the capture of digital images, one or more storage devices, such as hard disk drives, capable of storing a large number of the relatively large files previously discussed, and frequently, a disk drive capable of both reading and writing to large capacity removable storage mediums, such as the commercially available Zip® drive, rewritable CD ROMs or removable hard disks. The computer monitor 18 is typically selected from that group of color computer monitors capable of generating a wide range of color information, and producing accurate representations of photographic images in a variety of formats, such as RGB, CMYK and grey scale formats. The computer 14 and its associated components serve as the interface between the film encoding station 12 and the operator, and further serve to depict both edited and unedited images, image collections, and data associated with each image. The computer 14 further serves as the portal by which photographic image data may be transmitted over a network 24, or to other output devices.

The film encoding station 12 comprises a base plate 36, a front tool plate 38, a rear tool plate 40 (not shown in this view), a housing assembly 28 and a front cover 33, all of which serve to support and enclose the major operating components of the film encoding station 12. Affixed to the base plate 36 and tool plates 38 and 40 are an articulating camera 15, a feed spool 80, a take-up spool 82, a feed roller array 84, a take-up roller array 86, a drive roller 88, a sensor 90, a film punch assembly 92 and a lamp house assembly 94. Contained within the interior of the housing 28 are the various electrical, pneumatic and mechanical components which drive and control the operation of the film encoding station 12.

Figure 4:
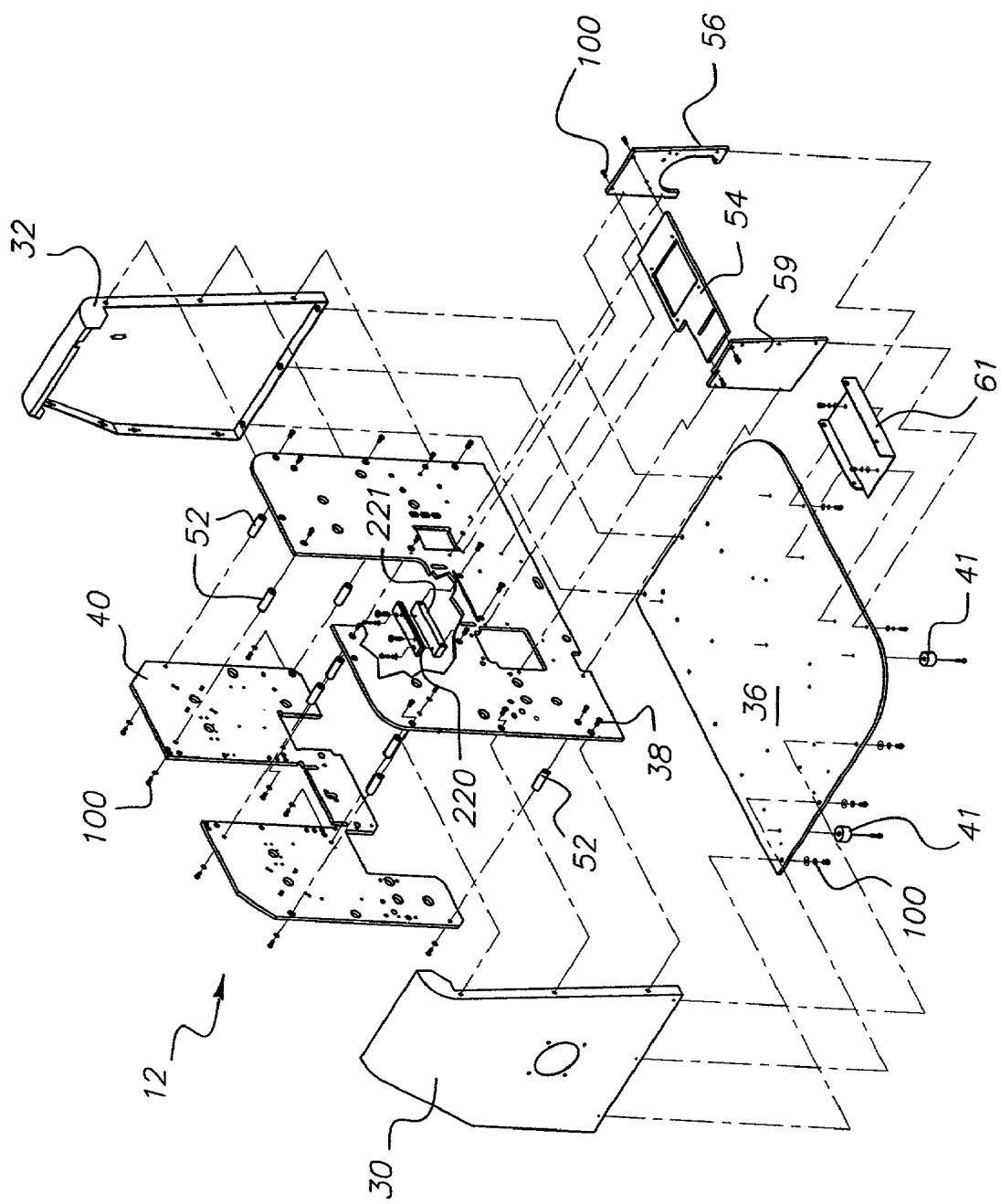
FIG. 4 is an exploded view of the main structural elements of the image capture and encoding station.

Further detail of the major components of the film encoding station can be best appreciated by reference to FIG. 4. The structural and operative elements of the film encoding station 12 are mounted to a framework providing a secure platform for the mounting of the various components. It is important to recognize that the film optical stage and camera must be rigidly mounted to extremely fine tolerances to insure both a high degree of repeatability and a high degree of precision in photographic imaging. The various elements of the film encoding station framework are enclosed by a housing assembly 28, consisting of housing side elements 30 and 32, base plate 36, front tool plate 38 and rear tool plate 40. The housing elements, when assembled, serve to enclose and protect the most sensitive components of the station, to support the various operative components and to further protect the operator from the hazards associated with moving components and high voltage electricity in this type of equipment. A plurality of foot elements 41 supports the base plate 36 from beneath.

Front tool plate 38 and rear tool plate 40 provide the support for the various spool shafts, roller shafts, and Y, Z-axis travel block, motors, punch assembly, edge detecting assembly, light source assembly, film hold down assembly, and punch waste receptacle. The tool plates 38 and 40 further provide support for the Y-axis mounting spacer 220 and a cropping template mounting block 221. Cooling exhaust fans are mounted to the housing to ventilate the interior of the housing.

FIG. 4 further shows the tool plates in relation to the lamp house top 54 and sides 59 and 56. An LED circuit board bracket 61 provides support for the primary light source LEDs. In the preferred embodiment, front tool plate 38, rear tool plate 40, housing sides 30 and 32, base plate 36, and lamp house elements are fastened together using traditional fastening means such as screws 100, to create the necessary physical support for the attached components. Front tool plate 38 and rear tool plate 40 are further interconnected by the screws 100, and separated by standoffs 52. Together these elements form the necessary physical structure of the device, to support the camera, film drive and lamp house.

Figure 5:
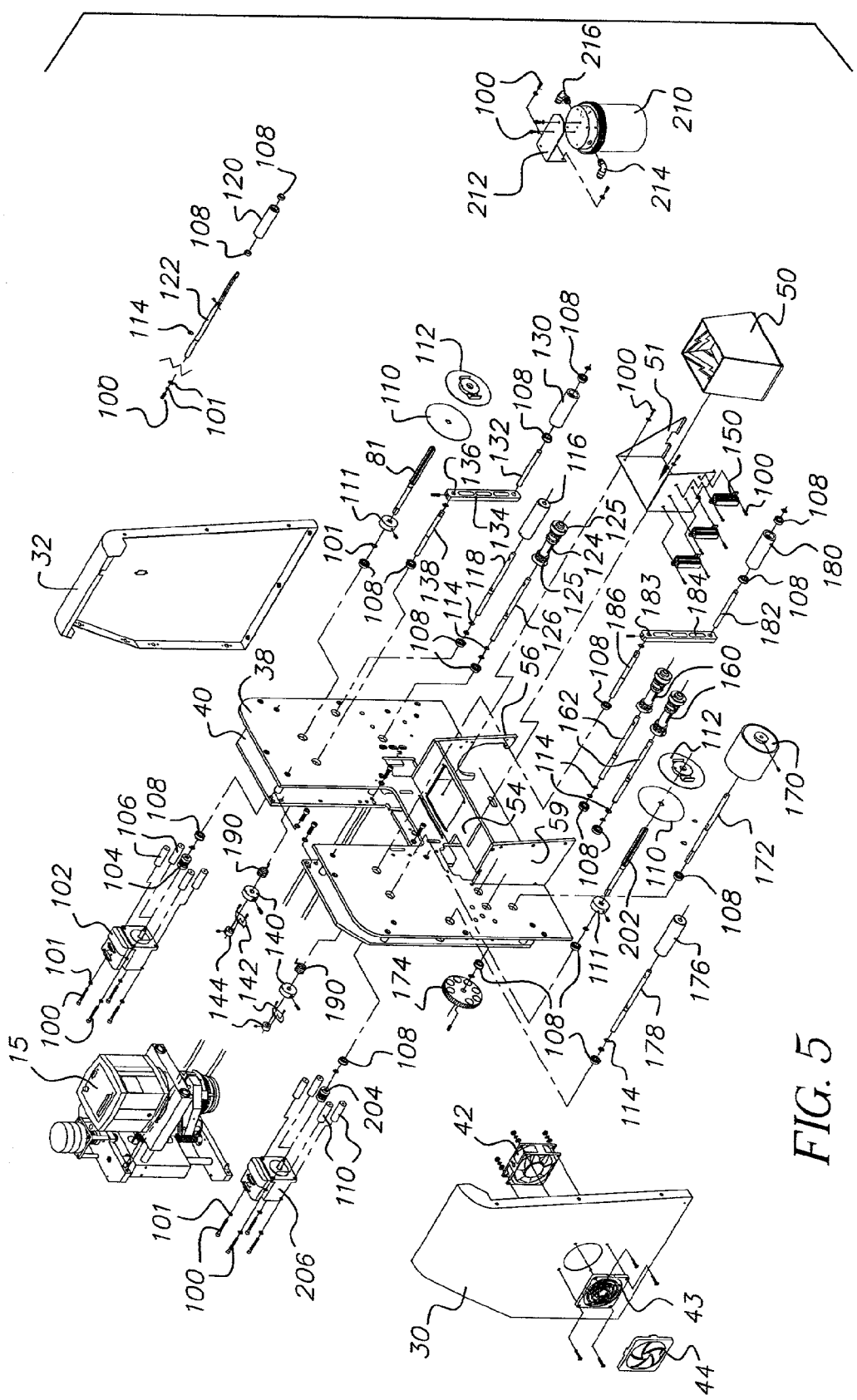
FIG. 5 is an exploded view showing the placement of the major components of the image capture and encoding station.

As seen in more detail in FIG. 5, front tool plate 38 and rear tool plate 40, when fastened together, form an assembly which supports, in part, the lamp house top 54, lamp house left side 59 and lamp house right side 56. The perimeter of front tool plate 38 also provides the mounting support surface for the perimeter of housing right side 32 and housing left side 30. Front and rear tool plates 38 and 40 further provide support for feed spool shaft 81. The feed spool shaft 81 is driven by an intelligent tensioning motor 102, which is coupled to feed spool shaft 81 by a coupling 104. The intelligent tensioning motor 102 is mounted to the rear tool plate 40 by spacers 106, washers 101 and fasteners 100. Feed spool shaft 81 is further supported by bearings 108, which provide a low friction fitting for the rotation of the feed spool shaft 81 in relation to front tool plate 38 and rear tool plate 40. The feed spool shaft 81 is further provided with a collar 111, washers 101, a spacer 110 and locking flange 112, which together serve to position and secure the film feed spool. Adjoining the feed spool shaft 81 is an idler roller 116 supported by an idler roller shaft 118, which is supported on the front tool plate 38 and rear tool plate 40 by bearings 108 and snap ring 114. Adjacent the idler roller are one or more particle transfer rollers 120 mounted on particle transfer roller shafts 122 utilizing bearings 108. Particle transfer rollers 120 are surfaced with a low tack adhesive to cause dust and other particles on the film to adhere to the surface of the particle transfer roller 120. Particle transfer rollers 120 are designed to be cleanable and reusable after becoming contaminated or soiled. Particle transfer rollers 120 are affixed to the front tool plate 38 and rear tool plate 40 utilizing conventional fasteners 100, washers 101, and snap ring 114. Adjacent to the particle transfer rollers 120 is a feed guide roller 124 which is pivotally mounted to guide roller shaft 126. Guide roller shaft 126 is mounted to front tool plate 38 and rear tool plate 40 utilizing one or more bearings 108 and snap rings 114. Guide roller 124 is incrementally adjustable to establish a width between guide portions 125 of guide roller 124 to accommodate varying widths of film. Tension on the film is maintained by a film tensioning roller 130, mounted on bearings 108, which are, in turn, mounted on the tensioning roller shaft 132. The tensioning roller shaft 132 is mounted to a distal end of bail arm 134. The proximal end 136 of the bail arm 134 is mounted to the bail arm pivot shaft 138, which, in turn, is mounted on bearings 108 fixed to front tool plate 38 and rear tool plate 40. Bail arm pivot shaft 138 protrudes through the rear tool plate 40 where it is provided with a spring 190, retaining collar 140, a switch vane collar 142 and a second retaining collar 144. Switch vane collar 142 provides positioning information to the intelligent tensioning motor 102 to insure that the appropriate tension is maintained on the film moving through the system.

The principal film optical stage is the lamp house top 54; the film is conveyed across the lamp house top 54 during the sensing, imaging and punching operations. The various guide and tensioning rollers herein described serve to position the longitudinal or X-axis of the film in relation to a camera 15 which is mounted, as will be explained in detail herein, in relation to the front tool plate 38 and lamp house top 54 to insure exposure of the film. The film is illuminated from below by a lamp house mixer 50 fixed to a lamp house mounting bracket 51, which, in turn, is mounted to the front tool plate 38 using fasteners 100. The lamp house mounting bracket also provides support for power resistors 150, attached to a lamp house mount bracket 51 which also acts as a heat sink for the resistors 150.

After passing over the lamp house top 54, the film is fed over guide rollers 160, which are mounted on guide roller shafts 162, which in turn are secured to the front tool plate 38 and rear tool plate 40 utilizing bearings 108 and snap rings 114. Between guide rollers 160 and 164 is the primary drive roller 170, which is affixed to drive roller shaft 172. Drive roller shaft 172 is mounted on bearings 108 and protrudes through to the rear side of the rear tool plate 40 where it is provided with a drive pulley 174 which provides the necessary film advance. The film is then routed over appropriate idler rollers 176 mounted to idler roller shafts 178, which, are in turn, mounted to the front tool plate 38 and rear tool plate 40 by bearings 108 and snap ring 114. The film is then routed over a take-up tensioning roller 180 which is mounted by bearings 108 to tensioning roller shaft 182 attached to the distal end of bail arm 184. The proximal end 183 of bail arm 184 is affixed to bail arm pivot shaft 186 which is in turn mounted on bearings 108 and to front tool plate 38 and rear tool plate 40. Bail arm pivot shaft 186 is provided with a tensioning spring 190, a collar 140, a switch vane collar 142 and a second retaining collar 144. In a fashion identical to the counterpart tensioning roller on the feed side of the invention, the switch vane collar 142 provides a positioning signal to the electronic circuitry of the system to maintain appropriate tension on the film. A take-up spool is mounted on a take-up spool shaft 202 which is mounted on bearings 108 to the front tool plate 38 and rear tool plate 40. The take-up spool is positioned on shaft 202 by spacer 110 and locking flange 112. One end of take-up spool shaft 202 is mounted via a coupling 204 to an intelligent tensioning motor 206 which is mounted to the rear tool plate by appropriate standoffs 110 and fasteners 100.

At least one side of the housing, and as shown in the embodiment pictured in FIG. 5, the housing left side contains a cooling fan 42 which is provided with both a fan guard 43 and a cover 44. Affixed to the front tool plate 38 is a punch receptacle 210 for receiving the waste punch material generated by the film punch (not shown). The punch receptacle 210 is attached to the front tool plate 38 by a punch receptacle bracket 212 and suitable fasteners 100. The punch receptacle 210 is provided with an inlet 214 and an outlet 216, to provide a pathway for sucking the punch waste into the receptacle as well as for connection to a vacuum source.

Figure 6:
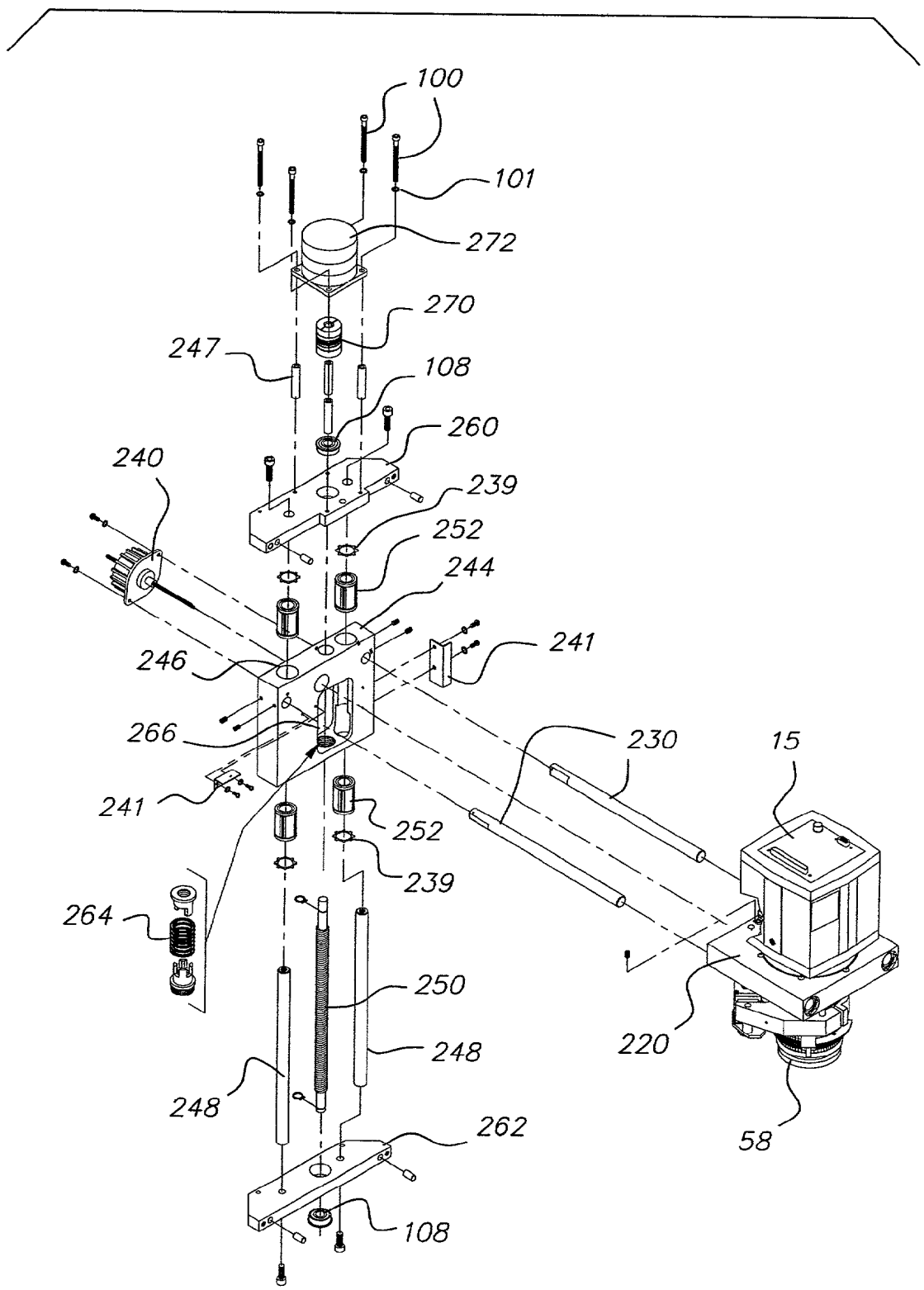
FIG. 6 is an exploded view of the digital camera in relation to the major components of the Z-axis transport.
Figure 7:
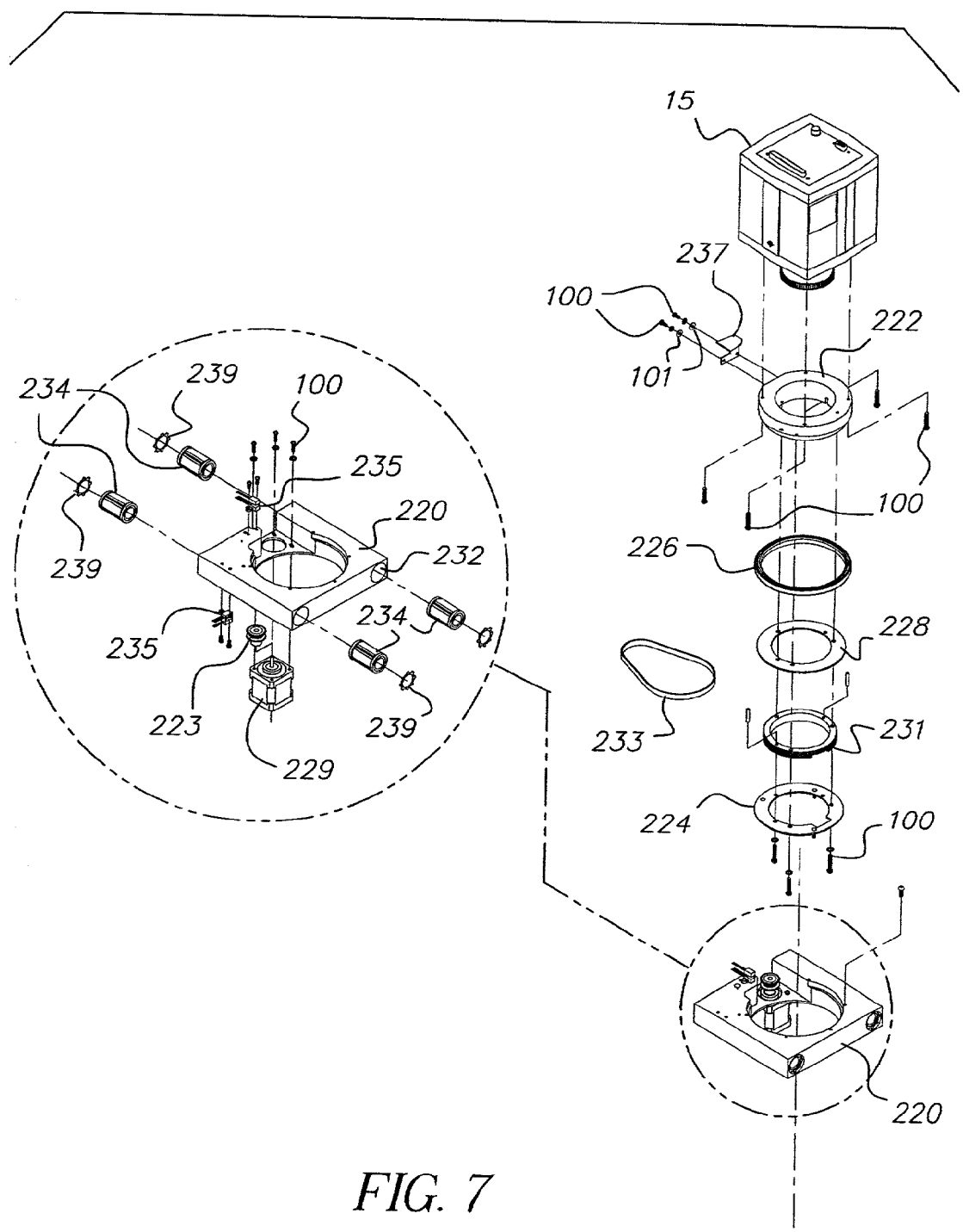
FIG. 7 is an exploded view showing the digital camera in relation to the major components of the Y-axis transport.
Figure 8:
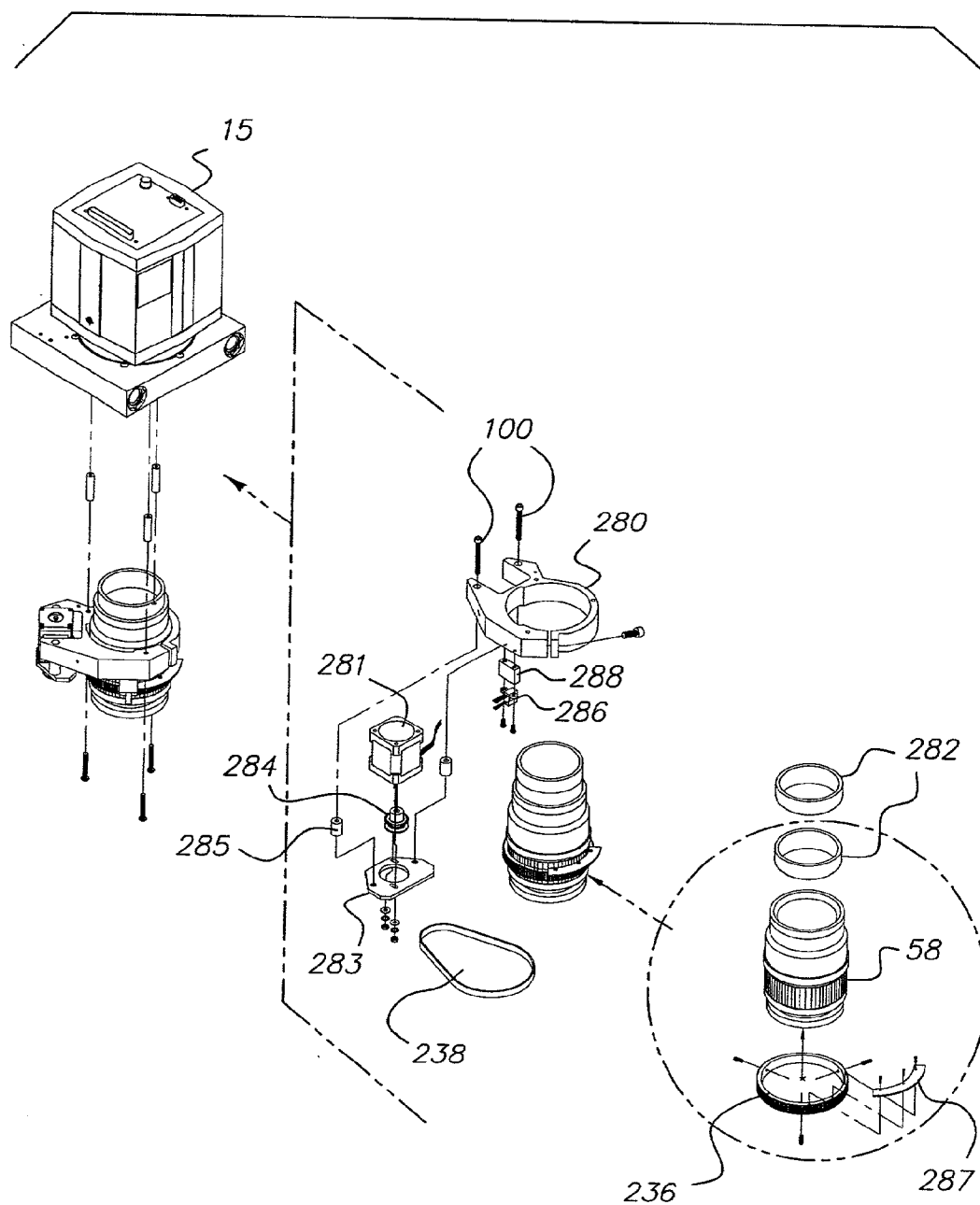
FIG. 8 is an exploded view showing the digital camera in relation to the rotational position and focus function of the camera.
Figure 9A:
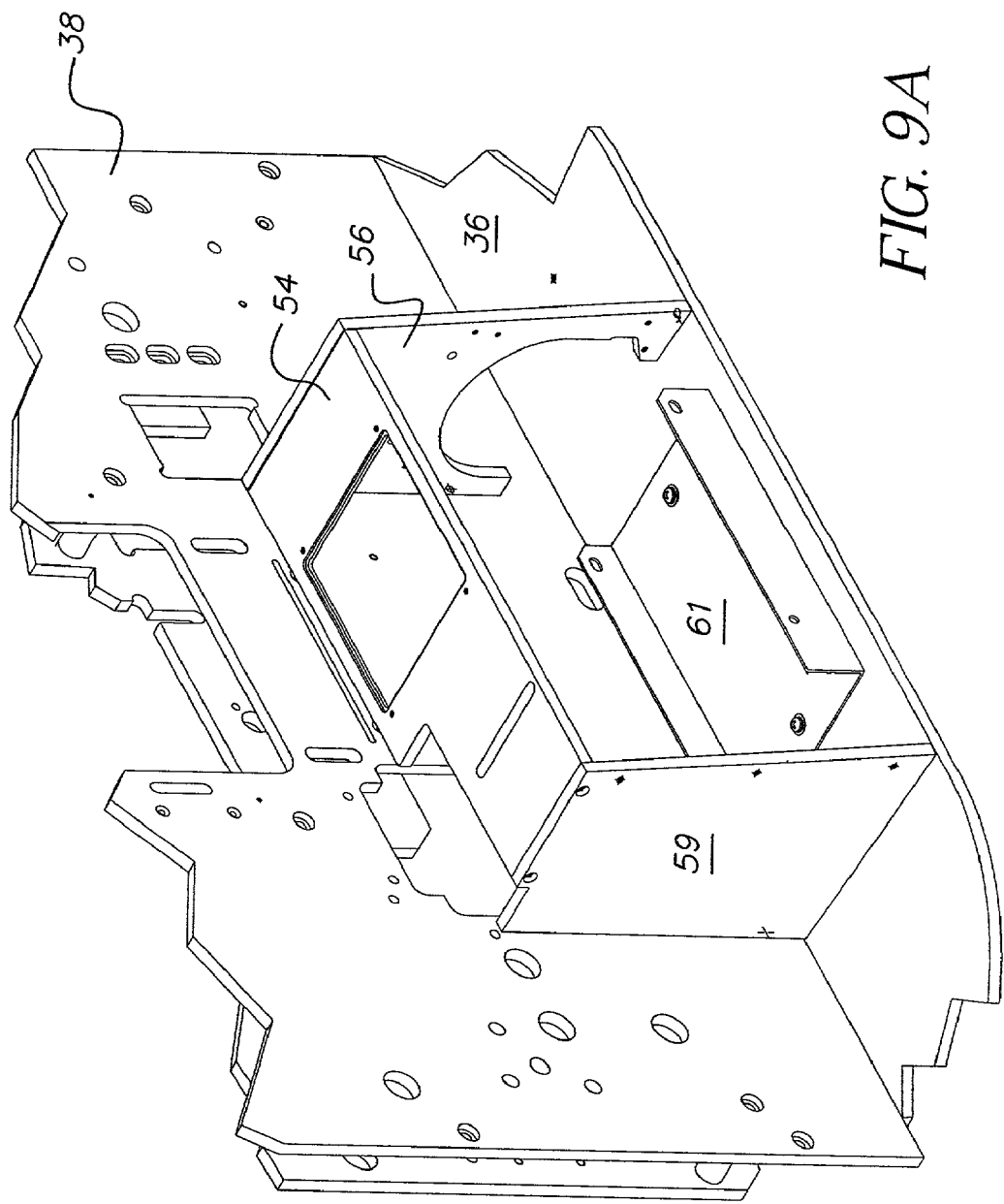
FIGS. 9A–9D are an exploded views of the main components of the lamp house.
Figure 9B:
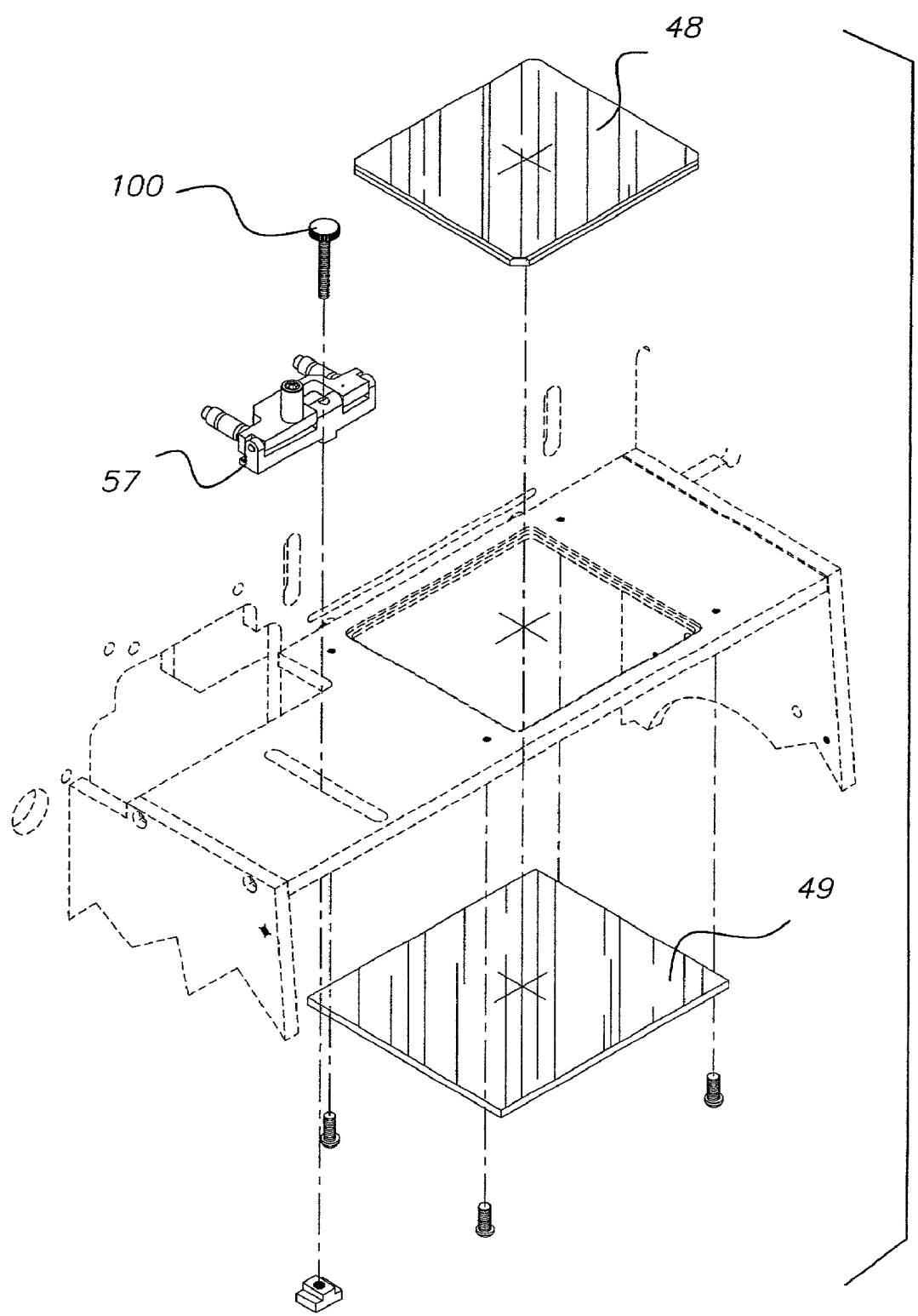
Figure 9C:
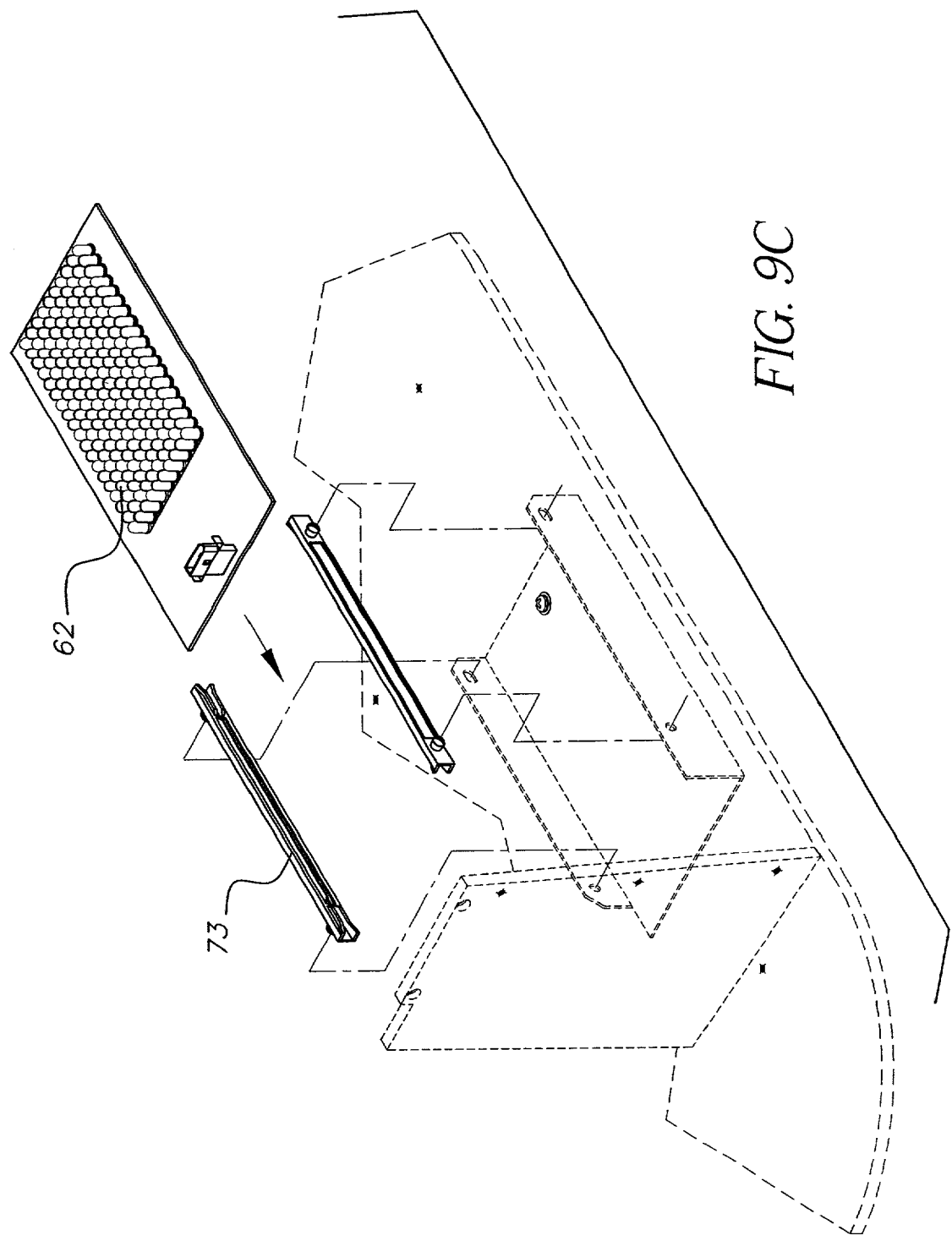
Figure 9D:
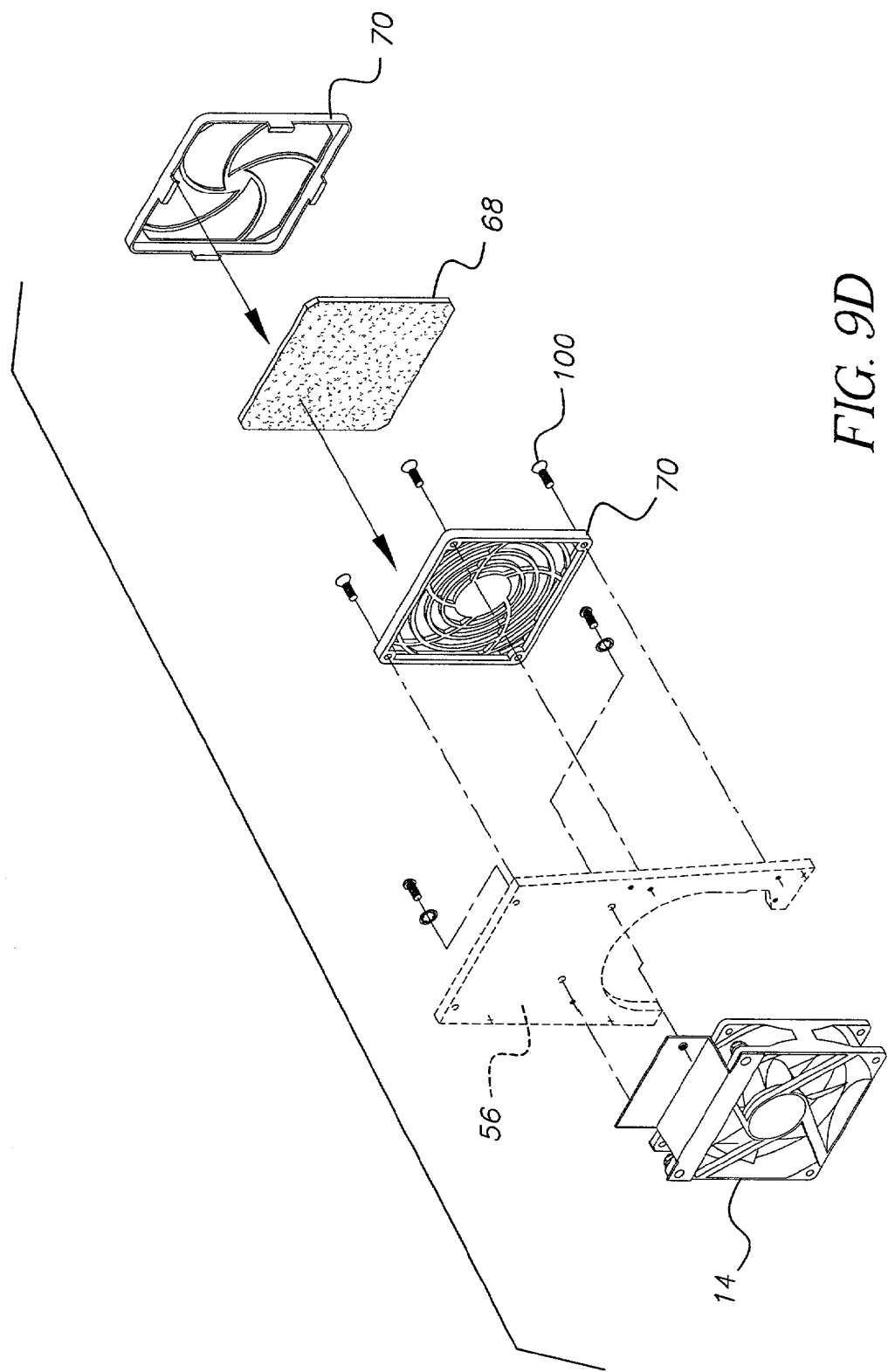

Reference to FIGS. 6–8 will facilitate an understanding of the operation of the video imaging camera assembly. The video imaging camera 15 is provided with a variable focus lens 58, which is a multi element lens of desired optical characteristics complimentary to the video camera and to the resolution of a wide range of color images. Camera 15 is secured to y-axis travel block 220 via camera ring 222. Travel block 220 is also attached to lens ring 224 using suitable fasteners 100. Y-axis travel block 220 is, in turn, provided with camera rotating ring 226. Rotator ring 226 is preferably in the form of a bearing or bushing thereby permitting camera to rotate freely within the Y-axis travel block 220. Motor 229 drives rotation pulley 223 and belt 233 to effect rotation of camera 15 in rotation to Y-axis block 220. Sensor flag 237 provides camera rotational signals to sensors 235. The camera is further secured to the Y-axis travel block 220 by camera retainer ring 228, utilizing fasteners. The Y-axis travel block 220 is mounted to a pair of Y-axis travel shafts 230 via through bores 232 in travel block. Low friction bushings 234 are press-fit into the bores 232 of travel block 220 and provided with retainers 239 to provide a low friction slidable relationship between travel shafts 230 and travel block 220. Lens 58 is provided with a pulley adapter 236, adapted to be engaged with a pulley belt 238. Y-axis movement of the travel block is imparted by means of a linear actuator 240. Selective positioning of the Y-axis travel block 220 is achieved by transmission of an appropriate signal which corresponds to a precise position of the linear actuator 240, and accordingly, a precise position of the Y-axis travel block 220 in relation to the optical stage of the apparatus. With continuing reference to FIG. 6, it can be seen that Z-axis travel block 244 accepts one end of Y-axis travel shafts 230. Z-axis travel block 244 is, in turn, provided with through bores 246 which accept Z-axis travel shafts 248 and Z-axis lead screw 250, with a provision for bearings 252 and retainers 239 which provide a relatively frictionless surface surrounding Z-axis travel shafts 248, permitting smooth vertical movement of the Z-axis travel block and the components mounted thereto. The upper and lower ends of the Z-axis travel shafts 248 and Z-axis lead screw 250 are affixed utilizing bearings 108 to upper shaft block 260 and lower shaft block 262 which, in turn, are affixed to the rear tool plate. A floating nut assembly 264 is placed in cavity 266 of Z-axis travel block, thereby engaging the threads of Z-axis lead screw 250. Rotation of Z-axis lead screw 250 drives Z-axis travel block 244 upwards and downwards, thereby repositioning camera 15 in relation to the plane of the film mounted on the image capture and encoding apparatus. The upper end of lead screw 250 passes through a bearing 268 in upper shaft block, and thence engages a flex coupling 270 and a stepper motor 272. The stopper motor 272 is mounted with standoffs 247 and fasteners 100, and drives rotation of lead screw 250. Sensor flags 241 provide reference position for sensors (not shown) to provide position information for the travel blocks.

Lens 58 has affixed thereto a lens focus motor mount 280. Attached to lens focus motor mount 280 is the lens focus drive motor 281, focus motor mount plate 283 and standoffs 285, all held together by conventional fasteners 100 with associated nuts, lock washers and washers. Affixed to lens assembly 58 is lens pulley adapter 236, to which is affixed lens focus sensor flag 287. Lens pulley drive 284 drives lens pulley 238, and in turn, lens pulley adapter 236 to alter the lens focus. The lens 58 is appropriately spaced from camera 15 by spacers 282. Sensor 286 is mounted to spacer block 288 by conventional fasteners.

It can be seen from this description that the various components described, including the travel blocks, shafts, lens, and rotating rings, result in an articulated camera assembly which may be urged to move vertically (the Z-axis) horizontally (the Y-axis), rotated (the R-axis), and vary in focus in relation to the plane of a negative being transported in the apparatus. Movements in each of these axes may be under computer control, or may be manual, depending on the operator's preference.

The structure and function of the lamp house may be seen by reference to FIGS. 9A–9D. The lamp house consists of a top 54, a right side 56, and a left side 59. Affixed to a top plate 54 are a negative glass 48 and a diffuser glass 49, a film guide assembly 57 is affixed to top 54 plate by suitable fasteners. Anti curl rollers are affixed to film guide assembly 57 to stabilize the film edges as the film is transported across the lamp house top 54. A LED light source printed circuit board 62 is mounted directly beneath the mixing chamber (not shown) by guides 73 affixed to bracket 61. The LED light source printed circuit board 62 is comprised of red, green and blue light emitting diodes, each group (R, G & B) is individually computer-controlled for precise exposure time. Each LED group is selectively operable allowing all, or any portion, of the array of light emitting diodes to be operated as desired.

To assist in the dissipation of the heat generated within the lamp house, the lamp house is provided with a lamp house fan 14, which is affixed by fasteners 100 to the lamp house right side 56, and provided with a lamp house guard 66, a filter 68 and a fan cover 70.

Figure 12:
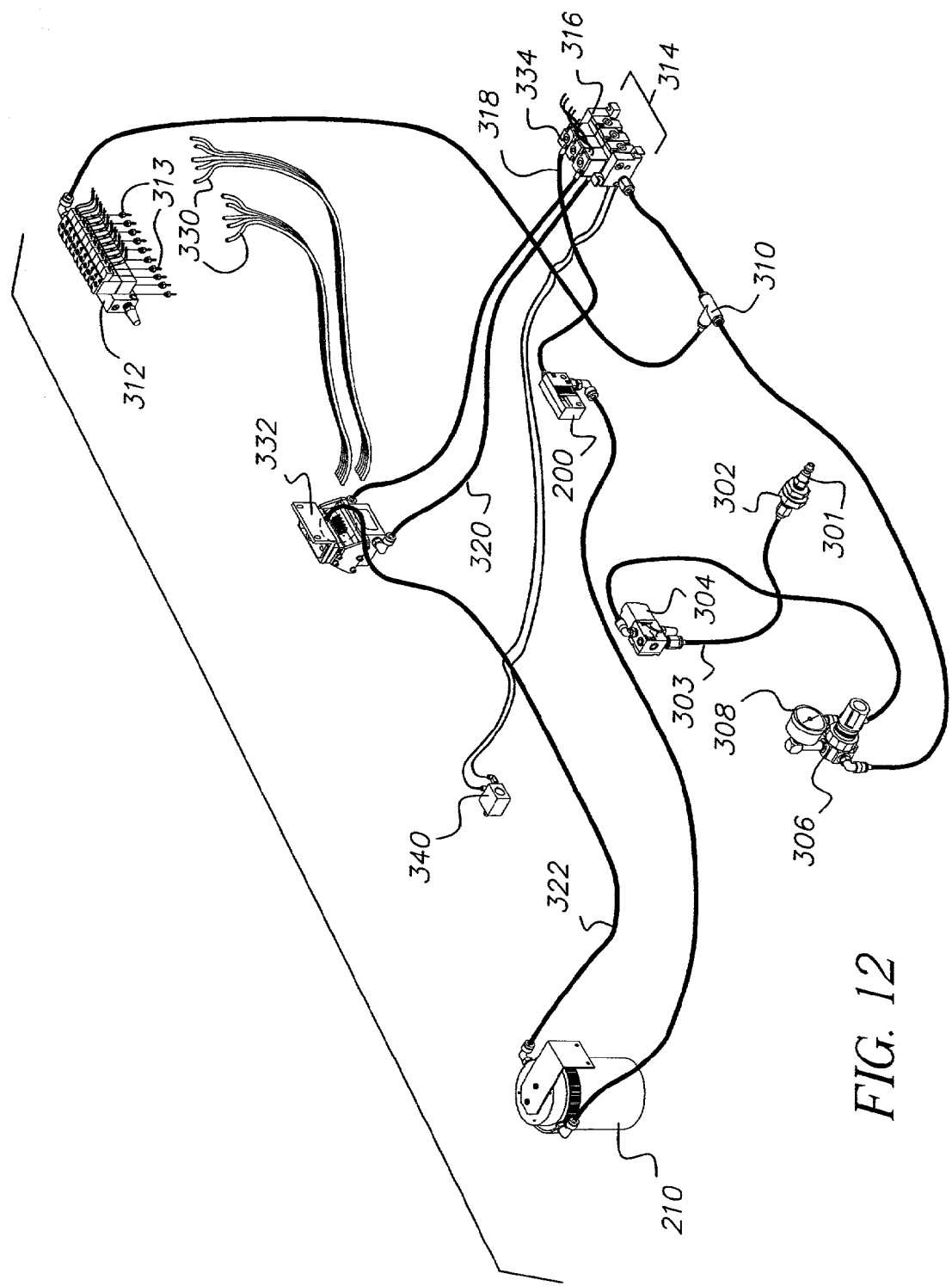
FIG. 12 is a view of the major pneumatic and vacuum components and their interconnection.

Because the apparatus relies upon a pneumatic power source to hold down the film and to operate the punch, a pneumatic source and distribution system is required, as shown in FIG. 12. The vacuum sources may be a venturi vacuum pump 200, which is selectively activated. A high pressure air inlet 302 is mounted to either the housing 28 or base plate 36 so as to be physically secure. Typically, the air inlet is provided with a quick disconnect nipple 301 which allows for easy connection and disconnection of a source of high pressure air. The inner inlet is connected by appropriate pneumatic tubing 303 to an on-off valve 304 which opens and closes in response to the application or removal of main system power to the station. The valve routes high pressure air to an air regulator 306 which is provided with an outlet pressure indicator 308, as well as a regulator to provide a known pressure of high pressure air to the remaining components of the pneumatic system. The regulator high pressure air is then routed to a T 310 which provides regulated high pressure air to the valve stack 312 as well as to the pneumatic manifold 314.

A further understanding of the system will be best understood by first understanding the vacuum system, comprising the vacuum pump 200, the vacuum controller 316 and the associated tubing 318. The vacuum pump provides a source of vacuum to the punch receptacle 210. Coupled with pressure from the manifold 314 provided to the punch assembly 332 through punch waste pressure line 320, punch waste is routed through the punch waste discharge tubing 322 to the punch receptacle 210.

Figure 12A:
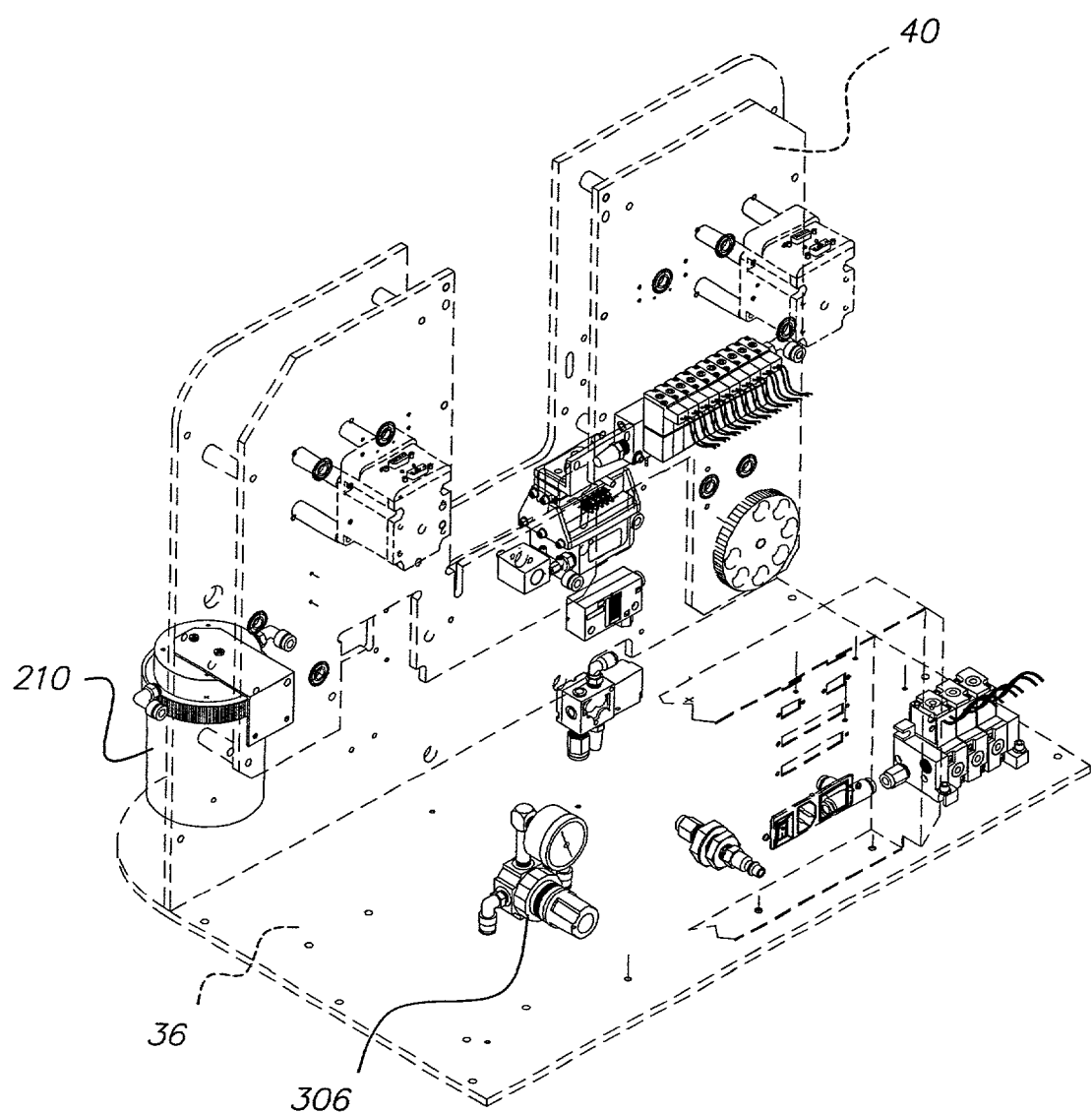
FIG. 12A is a view of the major pneumatic and vacuum components shown in relation to the main structural components of the image capture and encoding status.

Turning now to the pressure side of the pneumatic system, it can be seen that high pressure air is routed to valve stack 312, consisting of ten pneumatic valves. The position of each of the ten pneumatic valves is determined by electrical signals from the computer 14. The outlet 313 of each of the valves in the ten valve stack is connected by tubing arrays 330 to the punch assembly 332, thereby positioning the individual punches of the punch assembly 332 in a predetermined order. Typically, this punch system order is a binary code of ten bits, allowing encoding of numbers up to $2^{10}$. Once the valve stack 312 has sent the appropriate pneumatic signals to the editor punch assembly 332, an appropriate signal is sent to the editor punch assembly valve 334 to provide punching pneumatic pressure to the editor punch assembly 332, thereby driving the selected punch elements of the punch assembly 332 through the edge of the film. The pneumatic manifold 314 also provides a selective signal to the film hold-down cylinder 340, to operate the necessary film hold-down elements (not shown) to hold the film against the lamp house top 54 and negative glass 48 during image capture and encoding. The front tool plate 38 and rear tool plate 40 and base plate 36 are shown in ghost view in relation to the main pneumatic components in FIG. 12A. In one embodiment of the invention, the valve stack 312 is secured to the rear tool plate 40. The pneumatic manifold 314 is preferably mounted to the base plate 36. Air inlet 302, valve 304 and a regulator 306 may be mounted in any location within the housing 28, but are typically affixed to rear cover 34. Vacuum pump 200 may likewise be mounted anywhere within the housing 78, and in one embodiment is affixed to the interior side of the front tool plate 38. Punch assembly 332 is secured to front tool plate 38. Punch receptacle 210 is mounted to the front or exterior side of front tool plate 38 where it is easily accessible to the operator for emptying.

Activation of the punch assembly 332 mechanism itself forces individual punch elements to and through the film surface. As the punch system is actuated, a vacuum is applied to the punch chip reservoir 210, which is mounted to be easily removed from the apparatus so that it can be emptied and reattached. The vacuum facilitates separation of the chips punched from the film, urging them into the reservoir 210.

Figure 10:
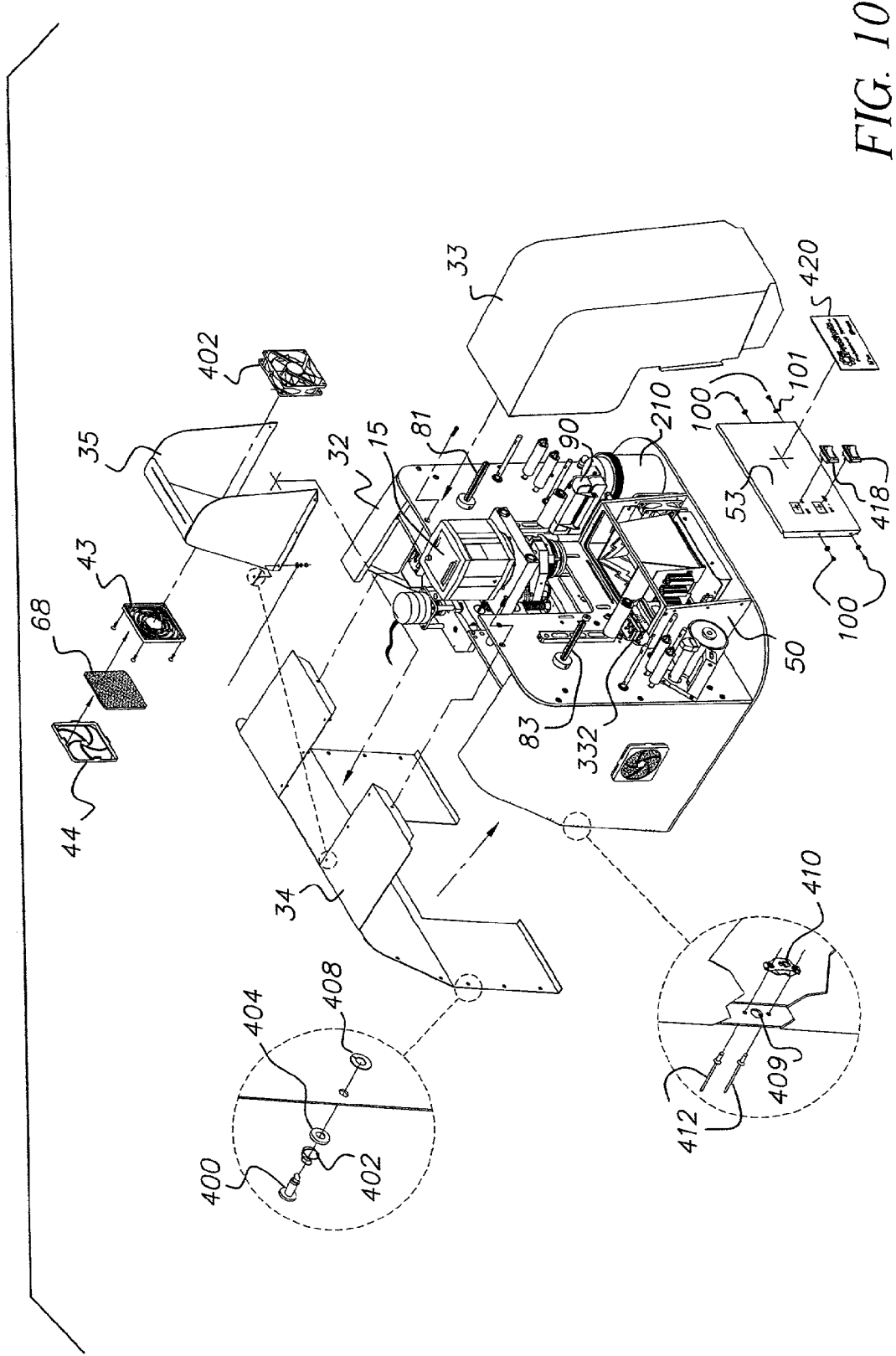
FIG. 10 is an exploded view showing the main housing components of the image capture and encoding station.
Figure 11:
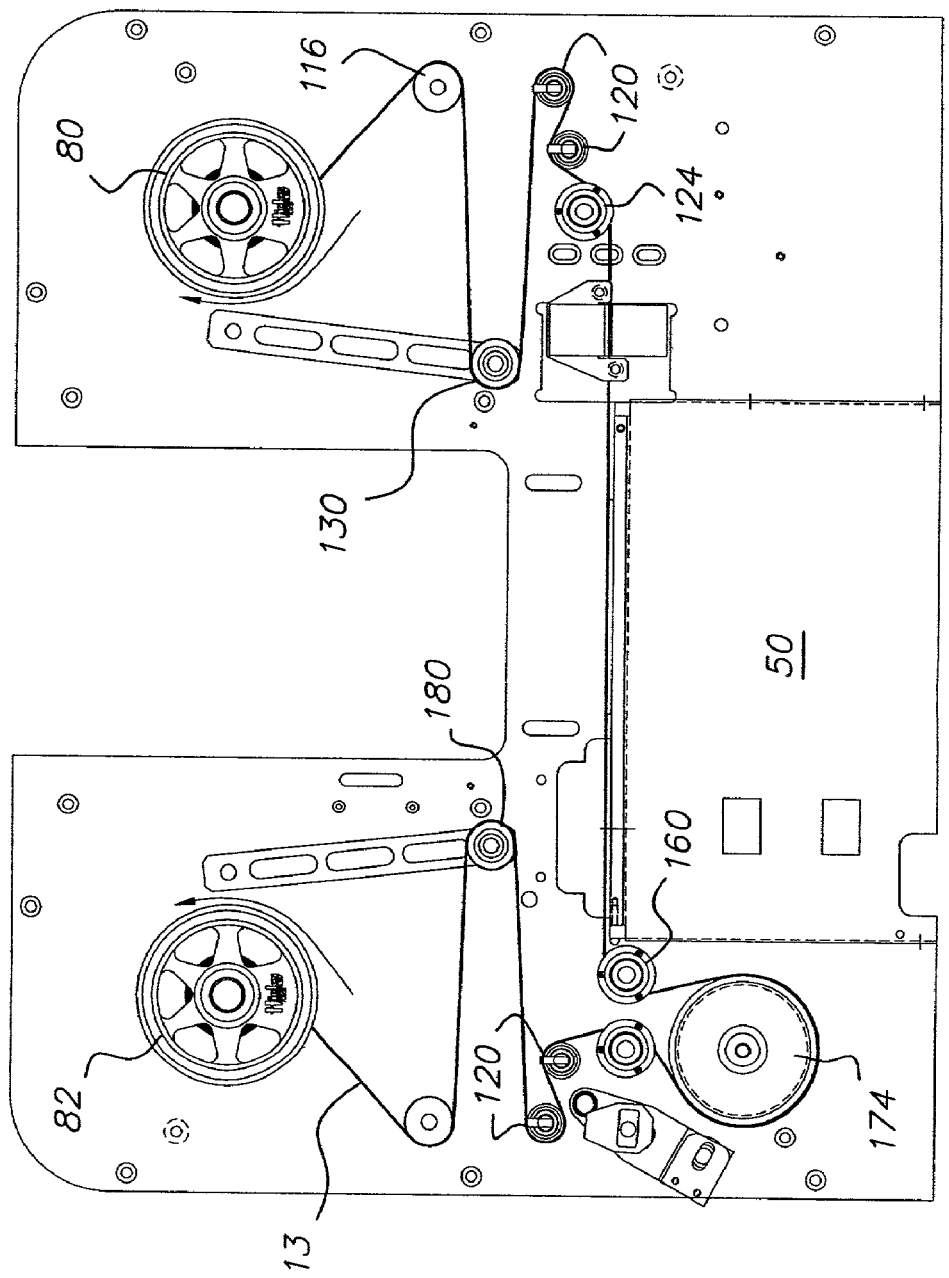
FIG. 11 is a front view of a portion of the image capture and encoding station showing the routing of the film.

With reference to FIGS. 10 and 11, detailed operation of the complete system proceeds as follows: A long roll of film 13 is mounted to feed spool 80. The free end of the film is routed around idler roller 116, tensioning roller 130, particle transfer rollers 120, guide roller 124 and across the optical stage of the lamp house 50. The film 13 is then fed across guide rollers 160, drive roller 174, particle transfer rollers 120, and tensioning roller 180 to a take-up spool 82 mounted on take-up spool shaft 83. The film feed shaft 81 and film take-up spool shaft 83 are driven, respectively, by film drive motors and film take-up spool motors (not shown), which serve to position the longitudinal or X-axis of the film in a desired position in relation to camera 15 and lamp house 50. Utilizing selective film drive techniques which are well known, the X-axis or position of the longitudinal centerline of the film can be precisely located in relation to the optical center of the lens 58 associated with camera 15. One edge of the film is positioned in relation to a film punch 332 located proximate the discharge end of the lamp house 50. A film chip reservoir 210 is provided to receive film chips generated by the film punch. During initial processing of the film long roll, the edge of each frame of the film is detected by edge sensor 90, and thereafter provided with a discrete punch code by punch 332. This discrete punch code serves to corelate and identify each frame of the long roll of film and associated digital data created and stored during the editing processes.

To facilitate servicing of the various components, certain elements of the housing are readily removable. Rear cover 34 is provided with a plurality of quarter turn fasteners 400, which, in turn, are provided with spring elements 402, washers 404 and split rings 408 designed to secure the quarter turn fasteners within holes 406 around the perimeter of the rear cover 34. The quarter turn fasteners 400 are likewise positioned to engage holes 409 and quarter turn fastener retainers 410 which are affixed to the perimeter of housing sides 30 and 32. Preferably, the quarter turn fastener retainers 410 are affixed to the perimeter of the housing sides by rivets 412. In this fashion, the rear cover can be removed from the station quickly without the need for sophisticated tools. The rear cover 34 is also provided with a top shroud 35 which, in one embodiment, is also provided with a cooling fan 402, a cooling fan guard 43, air filter 68 and cooling fan cover 44. The lamp house 50 portion of the station is likewise provided with a front cover 53 provided with operating switches 418 for providing both electric and pneumatic power to the device. It is typical to provide an identification plate 420 affixed to the front of the lamp house cover 53 to provide the manufacturer's name, as well as the model name, operating voltages, and other specifications for the system.

As each frame of the film long roll is detected and punched, it is simultaneously presented to the lamp house 50 stage. The lamp house is then illuminated, thereby presenting an image to camera 15. The image so presented is simultaneously displayed on computer monitor 18 as depicted in FIG. 1. Utilizing the visual image provided by computer monitor 18, the operator can provide multiple editing and positioning information. Specifically, the operator can view the image for color balance, common defects such as retinal reflection ("red eye"), closed eyes ("blink"), poor color balance, skin blemishes and other fundamental defects affecting the appearance of the photographic subject. At the same time, the operator can position the camera 15 in both the Y and Z axis and can rotate the camera about its central optical axis, the "R" axis, as well as apply cropping information. This permits a preliminarily edited image to be created in either landscape or portrait format or selectively rotated to a format intermediate landscape and portrait for artistic purposes.

Once the image has been evaluated and preliminarily edited as above-described, the image, together with its identifying code, camera position and associated preliminary edits is stored as a digital image. The finished image may be stored as a raw image and the editing information stored separately, or the image may be fully edited and only the edited image stored. The operator continues the editing process throughout each desired image of the long roll of film. Each image with its associated editing information is stored in a data base, wherein each data base record is discretely identified by the film frame code. Utilizing this code, therefore, the data for each individual image is easily retrieved.

Operation of the invention continues with transmission of the image and editing data to the originating photographer. Typically, this transmission takes place over a wide area network such as the internet, enabling the originating photographer to view the preliminarily edited photographs without the need for generating printed proofs. The originating photographer can easily review the photographs in the company of the ultimate customer, or can transmit the digital images to the ultimate customer for comment and ordering. After the originating photographer reviews the images and obtains an order from the customer, the originating photographer will transmit additional editing information to the photographic laboratory, together with ordering information.

At this stage, the output process begins. The original long roll film is again loaded into the image capture and encoding station which is, as previously discussed, provided with the necessary edge detection and punch code reader hardware insuring that the registration of the film during the original editing process can be precisely duplicated during the output process. Punch assembly 332 incorporates a punch code reader which permits identification of each frame. As each frame is detected and identified, therefore, the film positioning information from the original editing process is used to re-register the film 13 and camera 15 in the precise position established during the original editing step. Each frame is identified as one which will or will not be printed, as an initial step. Those frames which will not be printed are bypassed, and only those frames which will be printed are the subject of further processing. As each frame to be printed is presented to the optical stage of the image capture and encoding station, the original editing information provided in the original editing step, together with the editing data provided by the originating photographer are retrieved by the computer and applied to the image capture and encoding station, thereby simultaneously positioning the camera in Y and R axis as well as focus. Appropriate cropping and color balance information, as well as detailed edits of the photographic image are applied. With each of the above parameters thereby established and applied, the final image is then captured and output, either directly to digital output, or the parameters may be utilized to drive a conventional photographic printer, thereby regulating image size, cropping, color balance, masking, matting and orientation. Having thus described my invention, numerous insubstantial variations will be obvious to those skilled in the art, without departing from the invention, which I claim as follows:

What is claimed is:

1. An apparatus for editing photographic images comprising:
   means for transporting a continuous roll of said images from a feed point to a discharge point along a longitudinal axis;
   an imaging station intermediate said feed point and said discharge point;
   an illumination means proximate said imaging station;
   means for detecting the position of each of said photographic images in relation to said continuous roll;
   means for marking each of said individual photographic images on said continuous roll with a discrete identifying code;
   digital camera means;
   means for positioning said digital camera means in relation to said longitudinal axis;
   computer means for controlling said positioning means;
   means for displaying a positive image of said photographic image;
   input means for accepting editing information for said photographic images;
   digital storage means for storing digital data comprising photographic image data derived from said digital camera, data pertaining to the position of said digital camera and data obtained from said input means.

2. The apparatus of claim 1, which further comprises data transmission means for transmitting said photographic image data to a secondary editing station.

3. The method of claim 2 further comprising means for combining editing data from said secondary editing station with said photographic image data, said data pertaining to the position of said camera and said data obtained from said input means.

4. In an apparatus for capturing a series of digital images from a medium containing a series of visible images comprising a digital camera, apparatus adapted to position media, a light source for the media, an imaging station and an encoder that places an identification on each of said series of visible images, the improvement comprising a selectively operated computer controlled camera positioner, and memory containing information regarding said positioning of said camera as digital data.

* * * * *